Patented Oct. 24, 1939

2,176,995

UNITED STATES PATENT OFFICE 2,176,995

PAINT AND VARNISH REMOVER AND METHOD FOR USE

Gilbert F. Hoffmann, Milwaukee, Wis., assignor to Pittsburgh Plate Glass Company, Allegheny County, Pa., a corporation of Pennsylvania No Drawing. Application May 7, 1936, Serial No. 78,425

7 Claims. (Cl. 87—5)

This invention relates to a composition of matter adapted for use as a remover of old paint and varnish films and also to the method of using this composition most effectively. The invention relates especially to a composition comprising an aliphatic acid halide in combination with organic finish solvents which will not react with the acyl halide.

The primary object of my invention is the removal of old paint and varnish films by the use of a compound, such as an acyl halide, which will react vigorously with the ingredients of a dried coating film. A secondary object of the invention is to provide means for introducing an acid, or acid-forming reagent, into the old paint film so that it will attack that film from its under face. A further object of the invention is to eliminate a major portion of the manual labor heretofore necessary in the removal of old paint films.

The paint and varnish removers utilized in the prior art rely for the most part upon a solvent action to soften the paint film, which is then removed by means of a brush, scraper, or in some other convenient manner. It is apparent, therefore, that the use of such compositions entails considerable manual labor.

The present invention obviates the necessity of removing a softened film by cutting the film away from its base through a chemical action. The acyl halides, particularly acetyl chloride, have been found to possess, in addition to their active chemical properties, a powerful solvent action upon paint and varnish films. Because of this two-fold action, they provide a superior remover solution.

In order to illustrate my invention, the following specific examples are cited, it being understood that they are merely for purposes of illustration and in no way limit the scope of the present invention.

Example No. 1

| | Parts |
|---|---|
| Acetyl chloride | 50 |
| Methyl-ethyl ketone | 50 |
| Paraffin to saturation. | |

Example No. 2

| | Parts |
|---|---|
| Acetyl chloride | 33 |
| Methyl-ethyl ketone | 66 |
| Paraffin to saturation. | |

Example No. 3

| | Parts |
|---|---|
| Acetyl chloride | 33 |
| Methyl-ethyl ketone | 33 |
| Benzol | 33 |
| Paraffin to saturation. | |

Example No. 4

| | Parts |
|---|---|
| Acetyl chloride | 25 |
| Methyl-ethyl ketone | 50 |
| Benzol | 25 |
| Paraffin to saturation. | |

Although the use of hydrocarbons is not essential to the success of this remover, the incorporation of benzol or some other organic solvent has been found advantageous in increasing the solubility of a wax, such as paraffin, in the acyl-chloride-ketone mixture. Excess wax may be incorporated in the solution by adding it thereto while the solution is heated and allowing the mixture to cool gradually. Chlorinated hydrocarbons, such as carbon tetrachloride, may be included to reduce the inflammability of the final solution.

The preferred solution may be used in various ways. One application of this solution to an old paint film causes vigorous gassing and bubbling therewith resulting in sufficient loosening of the film to allow it to be lifted off the base thus exposing the bare wood. In instances where the paint film consists of many layers of hardened paint, only the top layer is removed. Subsequent application of the solution, of course, will repeat this action. After the remover has been allowed to react with the paint film, the treated surface is washed with water. This action prepares the surface for repainting.

It has been found that by applying a carbonate solution, ordinary washing soda is preferred, to the surface after the application of the remover solution, a second gassing and bubbling action is produced. This serves to disperse any film not removed by the remover solution alone and also dissolves any wax left adhering to the wood. Such treatment, of course, also neutralizes the excess acid and acid-forming reagent, producing water soluble salts which can be readily washed off with a stream of water to prepare the surface for refinishing.

The use of stiffening agents, such as excess wax, wood flour, starch, asbestine or bentonite in either or both the remover and carbonate solutions is desirable in order to allow heavier applications of those solutions on vertical surfaces. Paraffin or other wax is used to prevent or minimize evaporation of the treating solution. These factors are, however, well known to the art and do not alter materially the efficiency of the remover.

It is to be understood that many variations, both in composition and method of application, are possible without basically changing the principles underlying the invention.

What I claim is:

1. A paint and varnish remover comprising a solution of acetyl chloride dissolved in methyl-ethyl ketone.

2. A paint and varnish remover comprising a solution of from 25 to 50 per cent of acetyl chloride dissolved in methyl-ethyl ketone.

3. A paint and varnish remover comprising a solution of acetyl chloride dissolved in a mixture of methyl-ethyl ketone and benzol and paraffin.

4. A paint remover consisting of a solution of 25 parts by weight of acetyl chloride dissolved in a mixture of 50 parts by weight of methyl-ethyl ketone and 25 parts by weight of benzol and sufficient paraffin to saturate the solution.

5. A method of removing paint and varnish films which comprises applying a solution of acetyl chloride and methyl-ethyl ketone to the coated surface and subsequently washing the surface with water.

6. A method of removing paint and varnish films which comprises applying a solution of acetyl chloride and methyl-ethyl ketone to the coated surface and subsequently neutralizing the acetyl chloride with a soda solution.

7. A method of removing paint and varnish films which comprises applying a paraffin-containing solution of acetyl chloride in a mixture of methyl-ethyl ketone and benzol to the coated surface and subsequently applying a water solution of sodium carbonate to the treated surface.

GILBERT F. HOFFMANN.